3,359,431
APPARATUS RESPONSIVE TO THE OCCURRENCE OF A STATIONARY VALUE IN THE MAGNITUDE OF AN ELECTRICAL POTENTIAL
Alan J. Ramsay, Bothwell, Glasgow, Scotland, assignor to Minneapolis-Honeywell Regulator Company, Minneapolis, Minn., a corporation of Delaware
Filed May 19, 1964, Ser. No. 368,505
Claims priority, application Great Britain, May 29, 1963, 21,380/63
10 Claims. (Cl. 307—88.5)

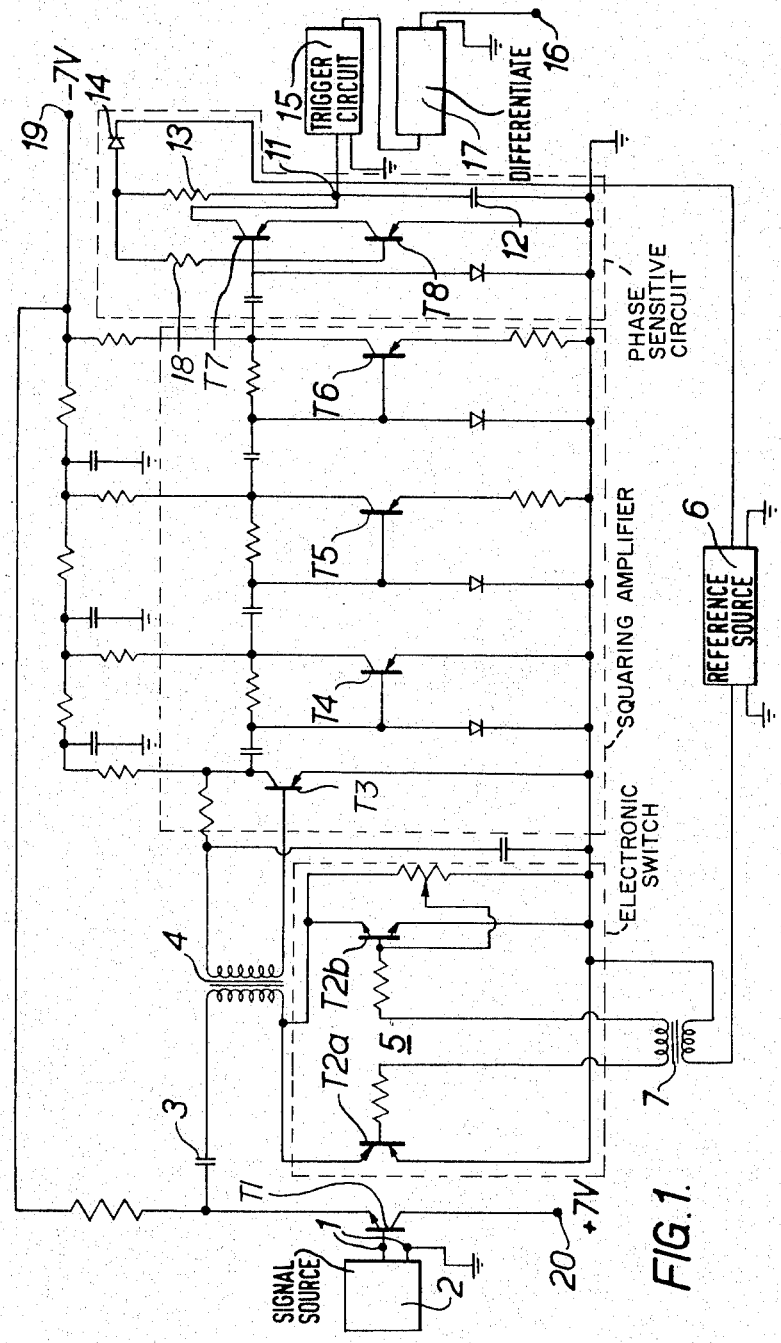

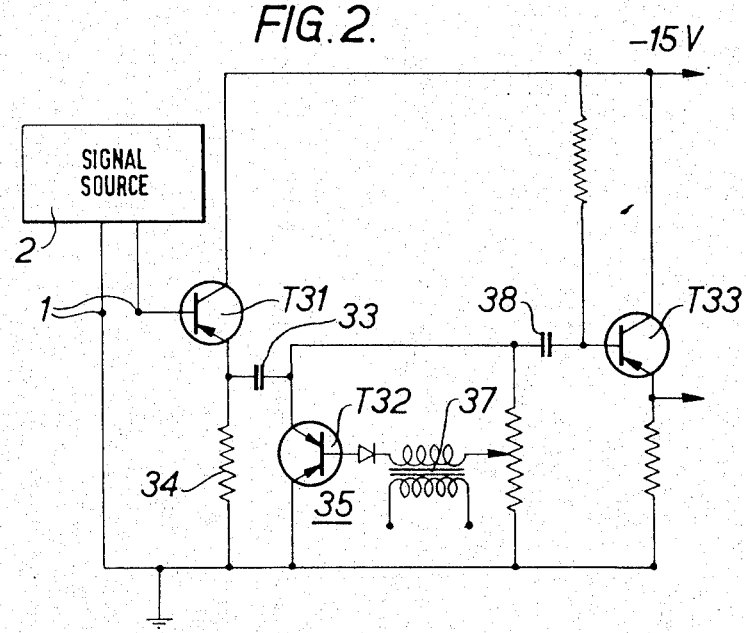

ABSTRACT OF THE DISCLOSURE

Apparatus wherein a synchronous switch periodically applies an input potential to a capacitor. As long as there is a difference between the capacitor voltage and the input potential, indicating that the latter is changing, a first signal is produced. This signal is amplified and applied to a phase sensitive circuit which produces a second signal only when the input potential is changing in a predetermined sense. The second signal holds a trigger circuit in a first state. When the input potential ceases to change in the predetermined sense, the second signal disappears, causing the trigger circuit to switch to a second state and to produce an output pulse indicative of the input potential having become stationary.

---

The present invention relates to electrical apparatus and in particular to electrical apparatus which is responsive to the occurrence of a stationary value in the magnitude of an applied electrical potential.

A particular application of apparatus according to the invention is for example an apparatus such as that described with reference to the drawings in copending United States application Ser. No. 365,354, filed on May 6, 1964, which is arranged to measure the area under the various peaks (which are uni-directional) of the electrical output signal of a vapour phase chromatography (V.P.C.) apparatus. In such apparatus, there is a requirement for a "valley" detector capable of detecting and providing an output signal on each occasion that the V.P.C. output signal comes to a minimum, the output signal or the commencement thereof, being coincident with the commencement of each such minimum should it be more than instantaneous. In practice, in operating a V.P.C. apparatus, the peaks are often incompletely separated so that, although in many cases the minimum is coincident with a return to a datum (usually zero) signal level. This is not always the case and some minima may be at a level considerably separated from the datum level, being at the intersection of the trailing edge of one peak and the front edge of another.

Whilst there is this particular application of apparatus according to the invention, other apparatus can be provided which is capable of detecting any stationary value in an applied electric potential, i.e. maxima and points of inflection as well as minima. In principle, the apparatus may be used with any applied potential regardless of its source.

It is theoretically possible to detect a stationary value in an applied potential by applying the potential to a differentiating circuit and providing some means for detecting when the output of the differentiating circuit becomes zero. In practice, if the applied potential includes any range of frequencies difficulty is encountered with problems arising from the variation of phase shift with frequency. In particular, it has been found difficult to provide, with simple circuitry, that the speed of response of the apparatus should be independent of the frequency of the signal. An alternative approach is therefore desirable.

According to the present invention electrical apparatus which is responsive to the occurrence of a stationary value in the magnitude of an applied electric potential, comprises a capacitance connected in series with a switch which has two operating conditions "open" and "closed," across a pair of input terminals to which, in operation, the potential is applied, means for recurrently opening and closing the switch at a predetermined frequency and means responsive to any difference between the applied potential and the potential across the capacitance for deriving an electric signal which changes in a predetermined manner on any occasion at which the applied potential ceases to vary having been varying in a particular sense. The apparatus may further include means for deriving a further electric signal which changes in a predetermined manner on any occasion at which the applied potential ceases to vary having been varying in the sense opposite to said particular one.

The switch is preferably an electronic switch, for example, a transistor switching circuit including a symmetrical transistor having its two collector emitter electrodes connected in series with the capacitance across the input terminals and means for applying a switching potential to the base circuit of the transistor to render it alternately conducting and non-conducting at said predetermined frequency. The single transistor may advantageously be replaced by a complementary pair of symmetrical transistors having their emitter/collector circuits connected in parallel, the switching potentials being applied to render them both conducting or both non-conducting. In any particular application, the predetermined frequency will have to be chosen so as to be high enough having regard to the minimum delay than can be accepted in detecting the occurrence of a stationary value and the probable speed of variation of the applied potential.

Said responsive means simply may include a resistance or a transformer primary winding connected in series with the switch and the capacitance, the input of an amplifier being coupled across the resistance or to the transformer's secondary winding. Said responsive means may include an amplifier having its input coupled across the switch, the magnitude of the capacitor and the input impedance of the amplifier being such that, when the switch is open, any such potential difference gives rise to a substantially constant current flowing through said input impedance. In either case, the amplifier is preferably such that it acts to "square" and amplify the waveform applied to its input.

Further, said responsive means may include a phase sensitive circuit to which a signal derived from the amplifier is applied in operation and means for applying a suitably phased reference potential of said predetermined frequency to the phase sensitive circuit whereby a particular output signal is produced only if a magnitude of the potential applied to the apparatus is changing in a selected sense. If required, two such phase sensitive circuits may be provided, the reference potentials supplied to them being oppositely phased, whereby separate output signals are produced one if the magnitude of the applied potential is changing in one sense and the other if it is changing in the other sense.

The output signal of the, or each, phase sensitive circuit may for example be applied to a two-state device such as a trigger circuit to maintain it in a predetermined one of its two states as long as the associated phase sensitive circuit produces its output signal. Such a two state device may conveniently be arranged to produce an output pulse on return to its other state, that is to say on each occasion that the potential applied to the apparatus ceases to vary having been varying on one particular sense.

The present invention further provides vapour phase chromatograph apparatus including electrical apparatus as defined above and means for applying the output signal of the chromatography apparatus to the electrical apparatus, which is arranged to produce an output signal on such occasion that the applied signal comes to a stationary value having previously been decreasing. Examples of apparatus according to the present invention will now be described with reference to the accompanying drawings in which:

FIGURE 1 shows the circuit diagram of a valley detector for use in the apparatus particularly described in said copending applicaton, and FIGURE 2 shows the circuit of an alternative to a part of the circuit of FIGURE 1.

Referring now to FIGURE 1, the apparatus according to the invention is shown having its input terminals 1 connected to a signal potential source 2 which may for example be the output of an amplifier which itself is coupled to receive the output signal generated in the output element, for example a catharometer, of a vapour phase chromatography (V.P.) apparatus. The amplifier may in particular be the pre-amplifier 2 shown in FIGURE 1 of the drawings of said copending application Connected across the terminals 1 is the input of a conventional emitter follower circuit including a transistor T1. Connected between the emitter of transistor T1 and earth is a series circuit comprising a capacitor 3, the primary winding of a coupling transformer 4 and an electronic switch 5 in the form of the collector/emitter circuits of a complementary pair of symmetrical transistors T2a and T2b. The switch 5 is controlled by applying a 50 c./s. square wave switching voltage in antiphase to the bases of the two transistors T2a and T2b so that both are either conducting or non-conducting. This switching voltage is derived from one output of a 50 c./s. reference source 6 through a transformer 7.

The secondary of the transformer 4 is coupled to the input of the first stage of a four stage squaring amplifier employing four similar transistor stages of conventional form and including respectively the four transistors T3–T6. The output of the fourth stage is taken from the collector of transistor T6 and applied to the base of a transistor T7 forming, with a further transistor T8, part of a gate circuit coupled to the reference source 6 so that in operation it is effectively a phase sensitive circuit. In the gate circuit, the emitter of transistor T8 is connected to earth, the collector of transistor T8 and the emitter of transistor T7 are connected together and the collector of transistor T7 is connected to a terminal 11 which is in effect the negative output terminal of a half-wave rectifier circuit including a capacitor 12, a resistor 13 and a diode 14, one side of which is connected to a 50 c./s. output from the source 6. Terminal 11 is also connected to one side of a trigger input of a trigger circuit 15, the output from which is applied to an output terminal 16 through a differentiating circuit 17.

The common terminal of the resistor 13 and the diode 14 are connected to the base of transistor T8 through a resistor 18.

A seven volts negative H.T. supply is connected in operation to terminal 19 and a seven volts positive one to terminal 20. Components not specifically described have conventional functions not relevant to the present invention.

The circuit shown in FIGURE 1 operates as follows. The 50 c./s. reference square wave supplied to the switching circuit 5 from the reference source 6 renders the transistors T2a and T2b alternately both conducting and both non-conducting. During a half cycles in which they are non-conducting, the voltage across the capacitor 3 which may for example have a capacitance of 20 microfarads, cannot follow any variation in the signal voltage applied from the emitter follower circuit, since there is no charge (or discharge) path available. The voltage across the capacitor thus remains constant during each of these half cycles. When the transistors T2a and T2b are conducting, however, the voltage across the capacitor rapidly returns towards the applied signal voltage since there is now a low impedance discharge (or charge) path to earth through them.

In this manner, therefore, if the applied signal is varying, there will, in alternate half cycles of the reference signal wave, be a current flowing through the primary winding of the transformer 4. The direction of the current will depend on the sense in which the input signal is varying since the capacitor 3 will be discharging if the input signal is decreasing and charging if it is increasing.

The result of this is that, when the input signal is varying, the input to the four-stage amplifier is a square wave the phase of which changes by 180° depending on whether the input signal is decreasing or increasing. This signal, of course, becomes zero if the input signal is constant. The four stage amplifier acts to square and amplify any input applied to it and the output from the last stage is applied to the base of transistor T7. The phase of the reference sine wave applied to the diode 14 in the halfwave rectifier circuit is arranged relative to that of the square wave applied to the switching circuit 5, so that its negative-going half cycles coincide with negative-going half cycles of the signal applied to the base of transistor T7 when the input signal is decreasing. When the input signal is increasing, they will coincide with the positive-going half cycles of the signal applied to the base of transistor T7.

Ignoring the effect of transistor T8 for the moment and assuming it is conducting when required so as not to interfere with the operation of transistor T7, it will be seen that the transistor T7 derives its operating potential from the terminal 11 in the half wave rectifier circuit which operates to tend to maintain the terminal 11 negative with respect to earth. The transistor T7 will conduct during the negative half cycles of the signal applied to its base.

In the half-wave rectifier, however, the capacitor 12 is made smaller than usual, for example 2 micro-farads, with the result that if the transistor T7 is conducting during those (i.e. negative ones) half cycles of the voltage applied to the rectifier from the source 6 in which the diode 14 is conducting, the charge on the capacitor 12 is not maintained and the negative voltage which would otherwise appear at terminal 11, is not produced. The relative phasing arrangement is such that this occurs when the input signal is decreasing. If the input signal is stationary or increasing, transistor T7 will either not conduct or become conducting in the opposite half cycles to those in which the capacitor 12 is charged by the half wave rectifier.

Transistor T8 has an unsmoothed half wave rectified voltage applied such that it can only conduct during the negative half cycles of the reference voltage applied to the rectifier. Transistor 17 can only conduct when transistor T8 is, and therefore the operations described above are affected by the operation of transistor T8 to the extent that transistor T7 can only conduct during the negative half cycles of the reference voltage and will therefore only be able to conduct if the input signal is decreasing. The voltage at terminal 11 therefore remains negative in other conditions but rises to near earth potential if the input signal is decreasing.

The trigger circuit, for example a conventional cathode coupled Schmitt trigger circuit using a pair of transistors, has a triggering input connected to terminal 11 and is arranged to change from a first of its two states to the second and back, as the voltage at terminal 11 changes from negative to earth and back. An output derived from one side of the trigger circuit 15 is applied to the differentiating circuit 17 which generates a short pulse in response to each change of state of circuit 15 and includes for example a diode to suppress those pulses corresponding to occasions when the circuit 15 changes from its first to its second state, these being of opposite polarity to those generated at a reverse change of state. These last appear at terminal 16 and will occur each time circuit 15 changes from its second to its first state. This will occur when the voltage at terminal 11 changes from earth to negative which will in turn occur when the input signal has been decreasing and ceases to do so. Thus, the pulses at terminal 16 will occur when there is a minimum in the input signal and at the commencement thereof if the minimum value is maintained more than instantaneously as occurs, for example, in operation with a V.P.C. signal when the potential returns to the baseline at the end of a peak and remains there for a period until the commencement of a new peak separated from the first one. There will also be a pulse if a point of inflexion occurs on a decreasing part of the input signal.

If more complete information is required concerning the occurence of stationary values in the input signal, it would be necessary to duplicate the gate circuit involving the transistors T7 and T8, the trigger circuit 15, the differentiating circuit 17, and the half wave rectifier circuit. It would also be necessary to reverse the phase of the reference potential applied to the duplicate rectifier circuit. The duplicate differentiating circuit 17 would then produce output pulses whenever the input signal comes to a stationary value having been increasing immediately beforehand, that is to say whenever there is a maximum, or a point of inflexion or an increasing part of the signal.

FIGURE 2 shows the input section of a modified circuit. In this case, the input terminals 1 are connected across the input of a conventional transistor emitter follower circuit including a transistor T31. A capacitor 33 and the collector/emitter electrodes of a symmetrical junction transistor T32 are connected in series across the output load resistor 34 of the emitter follower circuit. Transistor T32 forms part of a chopper circuit 35 i.e. an electronic switch, similar to those described in United States Patent No. 3,229,190, such that the transistor T32 effectively acts as an on/off switch connected in series with the capacitor 33. A square-wave switching potential having a frequency of 50 c./s. is applied to the chopper circuit from the reference potential source 6 (not shown in FIGURE 2), an output from which is connected to the primary winding of a transformer 37 connected in the chopper circuit 35.

Coupled across the emitter/collector terminals of the transistor T32 by means of a coupling capacitor 38 is the input of a second emitter follower circuit including a transistor T33. The output from this last circuit taken from across the emitter load is applied to the input of a four stage cascade transistor amplifier similar to that shown in FIGURE 1.

The operation of this circuit is slightly different from that of the corresponding parts of the circuit of FIGURE 1. The reference square wave supplied to the chopper circuit 35 from the source 6 renders the transistor T32 alternately conducting and non-conducting. During the half cycles in which it is non-conducting, the voltage across the capacitor 33 which may for example have a capacitance of 20 microfarads, cannot immediately follow any variation in the signal voltage applied across it and the transistor T32 in series from the first emitter follower circuit, since the only charge (or discharge) path available is that through the high input impedance of the second emitter follower circuit and the comparatively negligible output impedance of the first emitter/follow circuit in series with it.

The input impedance may be as much as 100 kilo-ohms. The voltage across the capacitor in fact remains nearly constant during each of these half cycles apart from the effect of a small substantially constant current flowing through this high impedance path. When the transistor T32 is conducting, however, the voltage across the capacitor rapidly returns towards the applied signal voltage since there is now a low impedance discharge (or charge) path through the transistor T32 and the output impedance of the first emitter follower circuit. During these half cycles substantially no current will pass through the input of the second emitter follower circuit which is in parallel with the transistor T32.

In this manner, therefore, there will, in alternate half cycles of the reference signal wave, be a constant current flowing through the input of the second follower circuit and no current. The direction of the constant current will depend on the sense in which the input signal is varying since the capacitor 33 will be discharging if the input signal is decreasing and charging if it is increasing.

The result of this is that, when the input signal is varying, the output from the second emitter follower circuit to the four-stage amplifier is a square wave either in phase or 180° out of phase with the reference square wave depending on whether the input signal is decreasing or increasing. This signal, of course, becomes zero if the input signal is constant. The amplifier and the remainder of the circuit are similar to the corresponding parts of FIGURE 1.

What I claim is:
1. Electrical apparatus responsive to the occurrence of a stationary value in the magnitude of an applied electric potential comprising
    a capacitor,
    a switch having alternate open and closed operating conditions,
    a pair of input terminals for connection to a source applying an electric potential between said terminals,
    circuit means connecting said capacitor and said switch in a series circuit between said terminals,
    drive means connected to said switch for recurrently placing it in said open and closed conditions at a predetermined frequency,
    potential responsive means connected to said series circuit and responsive to any difference between said applied potential and the potential across said capacitor for producing a first signal representative of any such potential difference,
    sense responsive means connected to said potential responsive means for producing a second signal in response to said first signal solely when said first signal results from changes in said applied potential in a predetermined sense, and
    output means connected to said sense responsive means for producing an output signal upon each occasion that said second signal indicates a reduction in said potential difference substantially to zero and hence that said applied potential has ceased to vary after having been varying in said predetermined sense.

2. Apparatus according to claim 1 wherein said switch is an electronic switch.

3. Apparatus according to claim 2
    wherein said switch is a transistor switching circuit including a symmetrical transistor having two collector-emitter electrodes connected in series with said capacitor between said terminals and having a base electrode, and
    wherein said drive means applies a switching potential to said base electrode to render said transistor alternately conducting and non-conducting at said frequency.

4. Apparatus according to claim 2
    wherein said switch is a transistor switching circuit including a complementary pair of symmetrical transistors having emitter-collector circuits connected in parallel with one another and in series with said capacitor between said terminals, and having base circuits, and
    wherein said drive means applies a switching potential in anti-phase to said base circuits to render both of said transistors alternately conducting and non-conducting at said frequency.

5. Apparatus according to claim 1, wherein said potential responsive means includes an amplifier having an input coupled to said series circuits, the values of said capacitor and of the input impedance of said amplifier being such that, when said switch is in its said open condition, said potential difference causes a substantially constant current to flow through said input impedance.

6. Apparatus according to claim 5,
wherein said potential responsive means includes a resistor connected in series with said capacitor and said switch, and
wherein said amplifier input is connected across said resistor.

7. Apparatus according to claim 5,
wherein said potential responsive means includes a transformer having a primary winding connected in series with said capacitor and said switch, and having a secondary winding, and
wherein said amplifier input is connected across said secondary winding.

8. Apparatus according to claim 1,
wherein said sense responsive means includes a phase sensitive circuit to which said first signal is applied, and
wherein there is included means for applying a suitably phased reference potential of said frequency to said phase sensitive circuit.

9. Apparatus according to claim 1,
wherein said output means includes a two-state device, and
wherein said second signal maintains said device in a predetermined one of its states as long as said potential difference exists.

10. Apparatus according to claim 9, wherein said output means includes means connected to said device for producing a short pulse of said output signal one each occasion that said device changes from said one state to the other of its states.

References Cited

UNITED STATES PATENTS

| | | | |
|---|---|---|---|
| 2,941,093 | 6/1960 | Merel | 307—88.5 |
| 3,002,154 | 9/1961 | Schmitz et al. | 328—150 X |
| 3,076,901 | 2/1963 | Rubin et al | 307—88.5 |
| 3,166,678 | 1/1965 | Fleshman et al. | 307—88.5 |
| 3,254,230 | 5/1966 | Wahrer | 307—88.5 |

ARTHUR GAUSS, *Primary Examiner.*

J. HEYMAN, *Assistant Examiner.*